United States Patent

Sugai et al.

[11] Patent Number: 6,031,313
[45] Date of Patent: Feb. 29, 2000

[54] BRUSH HOLDER DEVICE

[75] Inventors: Chikafumi Sugai; Susumu Aoki, both of Kiryu, Japan

[73] Assignee: Mitsuba Corporation, Gunma, Japan

[21] Appl. No.: 08/986,816

[22] Filed: Dec. 8, 1997

[30] Foreign Application Priority Data

Dec. 27, 1996 [JP] Japan .................................. 8-358839

[51] Int. Cl.⁷ ................................................ H02K 13/00
[52] U.S. Cl. .......................... 310/239; 310/241; 310/242; 310/245; 310/249
[58] Field of Search .................... 310/239, 241, 310/245, 249, 238, 242, 246

[56] References Cited

U.S. PATENT DOCUMENTS

| 1,935,789 | 11/1933 | Cullin | 310/239 |
|---|---|---|---|
| 2,711,491 | 6/1955 | Edmundson et al. | 310/239 |
| 3,518,475 | 6/1970 | Sebok et al. | 310/239 |
| 4,559,465 | 12/1985 | Gagneux | 310/242 |
| 5,053,665 | 10/1991 | Yamaguchi et al. | 310/239 |
| 5,717,271 | 2/1998 | Aoki et al. | 310/242 |

FOREIGN PATENT DOCUMENTS 0 455 253   11/1991   European Pat. Off. ........ H01R 39/38

OTHER PUBLICATIONS

Patent Abstracts of Japan—Publication No. 08154362, Jun. 11, 1996, Yaskawa Electric Corp.
Patent Abstracts of Japan—Publication No. 08214507, Aug. 20, 1996, Asmo Co., Ltd.

Primary Examiner—Thomas M. Dougherty
Assistant Examiner—Burton S. Mullins
Attorney, Agent, or Firm—McCormick, Paulding & Huber LLP

[57] ABSTRACT

In a brush holder device, in which an action-side end portion 22a of a torsion spring 22 is engaged with a torsion spring engaging groove 25 recessedly provided in an end surface of the brush 24 on the side opposite to a commutator 23, so that the elastic force of the torsion spring presses the brush against the commutator 23, a first inclined surface 26 is formed in the end surface of the brush 24 so as to incline at an angle of 15° relative to a plane perpendicular to the axis of the brush, and second inclined surface 27 is formed in the engaging groove 25, being superposed on the first inclined surface 26. Further, a pigtail 28 is connected to the brush at an offset point relative to the engaging groove 25. Because of the second inclined surface, the torsion spring can suppress so-called "wild behavior" of the brush, and thereby, can prevent brush sound. The angle of inclination of the first inclined surface can be set at a small value, the brush can be molded using a molding die.

6 Claims, 3 Drawing Sheets

BRUSH HOLDER DEVICE

BACKGROUND OF THE INVENTION

1. Field of the Invention

The present invention relates to a brush holder device, and in particular to a technique of preventing brush sound due to sliding of a brush in a brush holder made of resin and disposed opposite to a commutator, and, for example, to a brush holder device which can be effectively employed in a motor mounted on a vehicle.

2. Related Art Statement

As a conventional brush holder device used in a motor to be mounted on a vehicle, there is one in which, a brush is slidably inserted into a brush holder, and an action-side end portion of a torsion spring is engaged to an end surface of the brush on the side opposite to a commutator so that the torsion spring presses the brush against an outer peripheral surface of the commutator.

As described, for example, in Japanese Patent Laid-Open No. 8-154362, or Japanese Utility Model Laid-Open No. 4-137481, as this type of conventional brush holder device, there is one so constructed that an inclined surface is formed on an end surface (hereinafter, referred to as "back surface") of a brush on the side opposite to a commutator to prevent sound generated between the brush and an inside wall surface of a brush holder, accompanying sliding movement of the brush against the commutator. Namely, by engaging an action-side end portion of a torsion spring onto the back surface formed as the inclined surface of the brush, elastic force of the torsion spring is divided into component force along the normal of the commutator and component force pressing the brush against the inner surface of the brush holder's side wall, and thereby, sound generation due to sliding of the brush can be prevented.

Further, as shown in said 8-154362, the back surface of the brush is cut to provide an engaging groove with which the action-side end portion of the torsion spring is engaged, so as to stabilize behavior of the brush and to obtain good commutating action.

As for the above described brush holder device in which brush sound is prevented by the inclined surface, the present inventor has performed various tests on the component force for pressing the brush against the inner surface of the side wall of the brush holder. As a result, it have been found that, the inclination less than 25° is insufficient in its effect, and, on the other hand, larger inclination improves the effect while it results in wide scattering of sliding friction between the brush and the inner surface of the brush holder's side wall. From these test results, it is desirable to set inclination of the inclined surface of the back surface of the brush at 30°. The present inventor, however, has found that when inclination of the inclined surface is set at 30°, it becomes difficult to mold the brush by means of a molding die.

As the reason of difficulty, following phenomenon is considered. At the time of molding a brush by tamping in a molding die, particles of carbon, binder, and the like (hereinafter, referred to "brush particles") to form the brush show such a property that the particles align along a surface of a cavity of the molding die. In the case that an inclined surface is formed as a part of side surfaces of the cavity to form the inclined surface in the brush's back surface, alignment direction of the brush particles in the neighborhood of the inclined surface of the cavity conforms to that inclined surface, when the brush is molded. Accordingly, the alignment directions of the brush particles do not agree with a direction of tamping and become ununiform. When the alignment directions of the brush particles become ununiform, internal stress is generated, and thereby crack is produced in the brush. From the results of the above tests, a tendency has been found that this crack of the brush at the time of molding begins to be produced at an inclination of about 30°.

An object of the present invention is to provide a brush holder device which can ensure molding of a brush using a molding die, and, at the same time, can prevent generation of the brush sound.

On the other hand, to set the effective length of the brush long, it is necessary to connect a pigtail to the brush as near as possible to the back surface of the brush. When, however, an inclined surface is formed in the back surface of the brush, it is necessary to locate the pigtail away from the back surface by a length for avoiding the inclined surface. The larger the angle of inclination of the inclined surface is, the longer the length for avoiding the inclined surface is. Thus, in the brush having the inclined surface with the angle of inclination set at 30, the pigtail is connected to the brush much away from the back surface, and the effective length of the brush becomes shorter.

A second object of the present invention is to provide a brush holder device which can prevent decrease in the effective length of the brush.

SUMMARY OF THE INVENTION

To effectively prevent generation of brush sound, while ensuring molding of a brush using a molding die, a brush holder device, in which, a brush is slidably inserted into a brush holder, an action-side end portion of a torsion spring is engaged with a torsion spring engaging groove recessedly provided in an end surface of said brush, on a side opposite to a commutator, and an elastic force of the torsion spring presses the brush against the commutator, is characterized in that, a plural steps of inclined surfaces are formed in the end surface of the brush, so as to be inclined relative to a plane perpendicular to an axis of said brush, and the action-side end portion of the torsion spring is engaged with one of the inclined surfaces.

In the above-described brush holder device, an angle of inclination of the inclined surface with which the action-side end portion of the torsion spring is engaged, is preferably more than 25° and less than 30°, relative to the plane perpendicular to the axis of the brush.

Further, in the above-described device, such an arrangement may be adopted that a first inclined surface is formed to be inclined relative to a plane perpendicular to the axis of the brush, a second inclined surface is formed in the torsion spring engaging groove, being superposed on the first inclined surface, and the action-side end portion of the torsion spring is engaged with the second inclined surface. In this case, an angle of inclination of the second inclined surface is preferably 30° relative to said plane perpendicular to the axis of said brush.

In the above-described brush holder device, such an arrangement may be adopted that a pigtail is connected to a side surface of the brush, on a side of a proximal end of the first inclined surface, at an offset position relative to the torsion spring engaging groove and adjacently to an edge on the side of the proximal end of the first inclined surface. In this case, preferably, the brush holder has a cut-out portion for drawing out the pigtail toward the side wall of the brush holder, and the cut-out portion is formed in such width that said offset pigtail can be drawn out irrespective of mounting direction of said brush.

Furthermore, to prevent decrease in the effective length of a brush, a brush holder device, in which, a brush is slidably inserted into a brush holder, an action-side end portion of a torsion spring is engaged with a torsion spring engaging groove recessedly provided in an end surface of the brush, on a side opposite to a commutator, an elastic force of the torsion spring presses the brush against the commutator, and a pigtail is connected to the brush in a side surface intersecting the end surface, is characterized in that, the pigtail is connected to the brush at an offset portion relative to the torsion spring engaging groove.

In the brush holder device constructed as described above, while the motor is in operation, the brush receives the elastic force from the action-side end portion of the torsion spring to be biased against the commutator. Accordingly, vibration and impact are applied to the brush. Since, however, the action-side end portion of the torsion spring is engaged with the second inclined surface, the component force produced by the second inclined surface from the elastic force of the torsion spring presses the brush against the inner surface of the side wall of the brush holder, and thereby, the brush is kept from playing, and generation of the brush sound is prevented. Namely, due to the second inclined surface of the brush, the elastic force of the torsion spring can bias the brush into condition that so-called "wild behavior" is suppressed, preventing generation of the brush sound due to sliding of the brush against the commutator. Further, since the second inclination is formed being superposed on the first inclined surface, the whole angle of inclination of the second inclined surface is in the condition of having been set at an large angle, and, accordingly, the component force due to the second inclined surface becomes large. Namely, the effect of preventing the brush sound by the second inclined surface is realized effectively.

The present inventor has found that, when an angle of inclination of the inclined surface in the back surface of the brush is designed to be large, it becomes difficult to mold the brush by means of a molding die. However, the angle of inclination of the first inclined surface, which constitutes the back surface of the brush, is set smaller than the second inclined surface having an effect of preventing brush sound effectively, and therefore, the brush can be easily molded by means of a molding die. Namely, when the brush, which has the first inclined surface with smaller angle of inclination, is formed by tamping within the molding die, even if alignment directions of brush particles become slightly ununiform due to their tendency of aligning in conformity with side walls of a cavity, generation of internal stress is suppressed because of the smaller angle of inclination, and a crack does not generated in the brush.

Further, in the brush holder device, in which the pigtail is connected to the brush at an offset position relative to the engaging groove, the pigtail can be put close to the end surface of the brush on the side opposite to the commutator by the size of the torsion spring engaging groove, ensuring large effective length of the brush.

BRIEF DESCRIPTION OF THE DRAWINGS

FIG. 1(a) is a partially-omitted perspective view, FIG. 1(b) is a side view of a brush, FIG. 1(c) is a sectional plan view taken along c—c line of FIG. 1(a), and FIG. 1(d) is a sectional plan view taken along d—d line of FIG. 1(a);

DESCRIPTION OF THE PREFERRED EMBODIMENTS

Figure 1A:
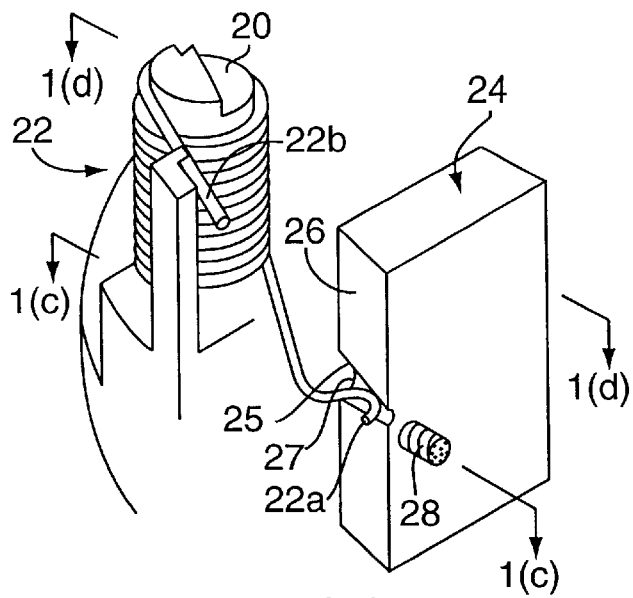
FIGS. 1(a)–1(d) show a brush holder device as one embodiment of the present invention.
Figure 1B:
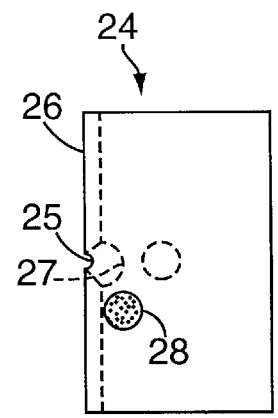
Figure 1C:
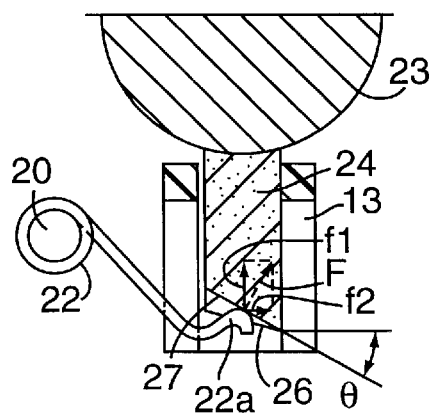
Figure 1D:
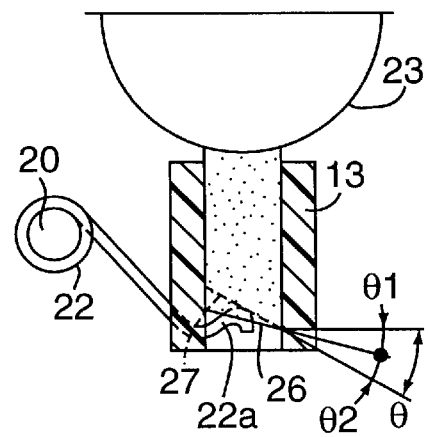
Figure 2:
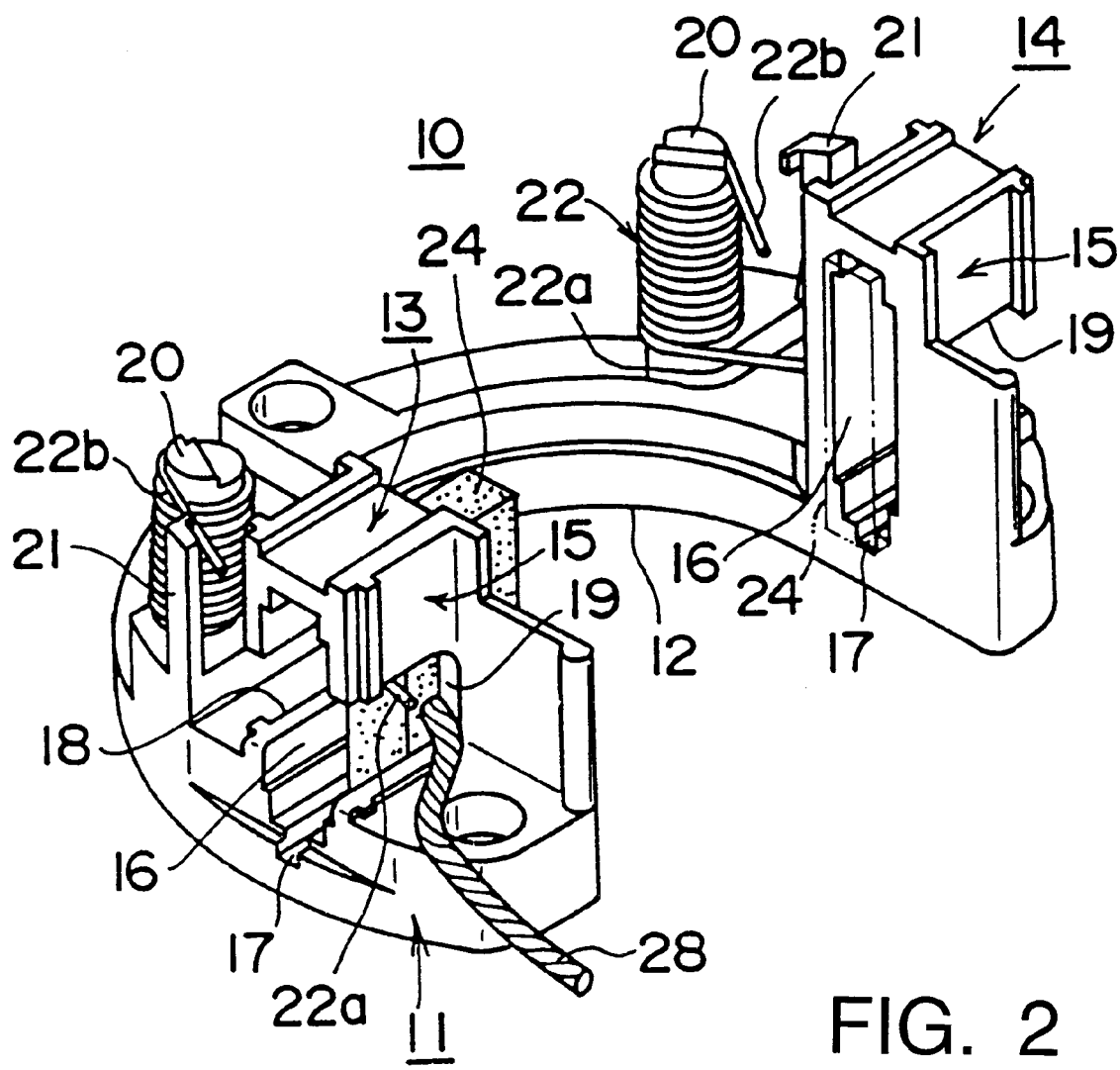
FIG. 2 is a partially-omitted perspective view of the brush holder device.

FIGS. 1(a)–1(d) show a brush holder device as one embodiment of the present invention: FIG. 1(a) is a partially-omitted perspective view, FIG. 1(b) is a side view of a brush, FIG. 1(c) is a sectional plan view taken along c—c line of FIG. 1(a), and FIG. 1(d) is a sectional plan view taken along d—d line of FIG. 1(a); and FIG. 2 is a partially-omitted perspective view of the brush holder device.

In the present embodiment, the brush holder device of the present invention is constructed as one used for a motor to be mounted on a vehicle. The brush holder device 10 is provided with a brush holder stay (hereinafter, referred to as "stay") 11 formed integrally as a plate of generally U-shape made of resin. The stay 11 has an outer shape conformed to an inner shape of a motor housing (not shown), and the stay's inner shape portion is formed to make a commutator insertion portion 12 conformed to a commutator 23.

On one end surface (hereinafter, referred to as "upper surface") of the stay 11, are integrally provided a plus side brush holder 13 and a minus side brush holder 14, being opposed to each other with the commutator insertion portion 12 between them, and projected upward in the vertical direction. The plus side brush holder 13 and the minus side brush holder 14 are formed in similar shapes arranged symmetrically to each other in relation to a center line bisecting the commutator insertion portion 12. Accordingly, only the construction of the plus side brush holder 13 will be described as a representative.

The brush holder 13 has a main body 15 formed generally in a shape of a rectangular cylinder. The main body 15 is arranged to stand on the upper surface of the stay 11 with its longitudinal sides of the rectangular cylinder being perpendicular to that upper surface, so that the cylinder axis is coincide with the normal of the commutator insertion portion 12. A brush housing 16 is defined by cylindrical inner diameter of the main body 15. The brush housing 16 is formed in such sizes that a brush described below can be slidably coupled into the brush housing in the direction of the cylinder axis (hereinafter, referred to as "in-out direction") to be held therein, and both inner and outer end surfaces of the brush housing 16 are opened. In a bottom surface inside the brush housing 16 of the main body 15, a brush cooling groove 17 for preventing rise in brush temperature is recessedly provided so as to extend in the in-out direction with constant width and constant depth. Further, in side walls on both sides of the main body 15, a cut-out portion 18 for a torsion spring and a cut-out portion 19 for drawing out a pigtail are integrally opened respectively, so as to extend in the in-out direction. An outer end of each cut-out portion 18, 19 is opened in an outer end of the corresponding side wall.

On the upper surface of the stay 11, a pair of torsion spring holding columns (hereinafter, referred to as "holding columns") 20 are provided to project perpendicularly in sides of both brush holders 13, 14, respectively. A torsion spring 22 is held on each holding column 20, being mounted around the outside of the holding column 20. On the upper surface of the stay 11, in positions adjacent to the holding columns 20, torsion spring stop columns (hereinafter, referred to "stop column") 21 are provided to project perpendicularly, respectively. Each of the stop columns 21 receives and stops an end portion 22b on a reaction force side of the corresponding torsion spring 22.

A brush 24, which slides on the commutator 23, is received in the brush housing 16 of the brush holder, slidably in the in-out direction. The brush 24 is formed in such a manner that brush particles are tamped to form a generally rectangular flat table shape by means of a molding die (not shown), and then, sintered. An inner end surface of the brush 24 is abutted against the commutator 23, and an outer end surface (back surface) is engaged with an action-side end portion 22a of the torsion spring 22.

In the back surface of the brush 24, a torsion spring engaging groove (hereinafter, referred to as "engaging groove") 25 for engaging with the action-side end portion 22a of the torsion spring 22 is recessedly provided to have a generally semicircular shape in section. In the back surface of the brush 24, in which the engaging groove 25 is recessedly provided, a first inclined surface 26 is formed all over the back surface, being inclined in relation to a plane (hereinafter, referred to as "perpendicular plane") perpendicular to the axis of the brush 24, in a direction of a plane tangential to an outer peripheral surface of the commutator 23. The angle $\theta 1$ of inclination of the first inclined surface 26 to the perpendicular plane is set at 15°.

The engaging groove 25 is disposed in the middle portion of the first inclined surface 26 which substantially constitutes the back surface of the brush 24, and lies in a direction (hereinafter, referred to as "horizontal direction") perpendicular to the axial direction of the commutator 23. In the bottom surface of the engaging groove 25, second inclined surface 27 is formed. The angle $\theta 2$ of inclination of the second inclined surface 27 relative to the first inclined surface 26 is set at 15°. Thereby, the whole angle $\theta$ of inclination of the second inclined surface 27 relative to the perpendicular plane is obtained by superposition, $\theta 1+\theta 2$, which amounts to 30°.

Since the bottom surface of the groove is recessed to constitute the second inclined surface 27, the engaging groove 25 is made to be tapered, being gradually broadened toward the direction that the second inclined surface 27 becomes deeper. Against the engaging groove 25, the action-side end portion 22a of the torsion spring 22 is abutted, from the side on which the second inclined surface 27 is deeper. The action-side end portion 22a of the torsion spring 22 is curved in a semicircular arc so that the end portion 22a is easily abutted against the inclined surface 27.

The action-side end portion 22a of the torsion spring 22 biases the brush 24 toward the commutator 23, while the reaction-force-side end portion 22b of the torsion spring 22 is engaged with and received by the stop column 21. In this biasing condition, the action-side end portion 22a of the torsion spring 22 perpendicularly biases the second inclined surface 27 of the brush 24, and elastic force F of the torsion spring 22 may be interpreted as a resultant force of a component force (hereinafter, referred to as "commutator-side component force") f1 in the direction of the normal of the commutator 23 and a component force (hereinafter, referred to as "holder-side component force") f2 which presses the brush 24 against the inner surface of the side wall of the brush holder 13 on the opposite side to the holding column 20.

To the side surface of the brush 24 on the side of the proximal end of the first inclined surface 26, a pigtail 28 is connected, at a shifted, i.e., offset position below from the engaging groove 25, adjacently to the edge on the side of the proximal end of the first inclined surface 26. Namely, one end of the pigtail 28 is embedded into the inside of the brush 24 to be electrically connected thereto, in such a manner that, it is connected to the position nearest to the back surface of the brush 24, and the embedded end of the pigtail 28 is not exposed in the first inclined surface 26 and the second inclined surface 27. In other words, the pigtail 28 is connected to such a position of the brush 24 that the largest effective length can be ensured as far as the pigtail 28 does not interfere with the first inclined surface 26 and the second inclined surface 27.

Further, in accordance with the offset pigtail 28, the cut-out portions 19 of the brush holders 13, 14 are made larger than the conventional one, so that the brushes 24 of the same shape can be commonly used in both the plus and minus sides. The brushes 24 are used upside down with each other in the plus side and the minus side. Accordingly, to use the brushes 24 with the same shape commonly in both brush holders, the cut-out portion 19 should be larger in vertical direction in accordance with the offset distance of the pigtail. Employing this arrangement, in the present brush holder device 10, it is not necessary to prepare two kinds of brushes 24 having spatially inverse configuration or to provide the cut-out portions 19 at different positions in the plus and minus sides, respectively.

In the brush holder device constructed as described above, while the motor is in operation, the brush 24 receives the elastic force from the action-side end portion 22a of the torsion spring 22 to be biased against the commutator 23. Accordingly, vibration and impact are applied to the brush 24, being affected by sliding resistance of the commutator 23 and by irregularity in the shape of the commutator 23. In the present embodiment, however, the holder-side component force f2 of the elastic force F of the torsion spring 22 presses the brush 24 against the inner surface of the side wall of the brush holder 13, and thereby, the brush 24 is kept from playing, and generation of the brush sound is prevented. Namely, due to the second inclined surface 27 of the brush 24, the elastic force of the torsion spring can bias the brush 24 into condition that so-called "wild behavior" is suppressed, which prevents generation of the brush sound due to sliding of the brush 24 against the commutator 23.

Further, in the present invention, the whole angle $\theta$ of inclination of the second inclined surface 27 formed by the bottom surface of the engaging groove 25, with which the action-side end portion 22a of the torsion spring is engaged, is set at 30°, which means that the brush 24 is pressed against the inner surface of the side wall of the brush holder 13 with best force. Namely, the effect of preventing the brush sound is realized maximally.

As described above, the present inventor has found that, when an angle of inclination of the inclined surface in the back surface of the brush is designed to be more than 30°, it becomes difficult to mold the brush by means of a molding die. In the present embodiment, however, the angle $\theta 1$ of inclination of the first inclined surface 26, which constitutes the back surface of the brush 24, is set at 15°, and therefore, the brush 24 can be easily molded by means of a molding die. Namely, when the brush 24, having the first inclined surface 26 with the angle $\theta 1$ of inclination being 15°, is formed by tamping within the molding die, even if alignment directions of brush particles become slightly ununiform due to their tendency of aligning in conformity with side walls of a cavity, generation of internal stress is suppressed because of the smaller angle of inclination, and a crack does not generated in the brush 24.

Further, in the present embodiment, the pigtail 28 is connected to the brush 24 at the offset position relative to the engaging groove 25. Accordingly, the pigtail 28 is connected to the brush 24 in the position nearest to the back surface of the brush 24 in such a manner that the pigtail's end embedded into the inside of the brush 24 is not exposed in the first inclined surface 26 and the second inclined surface 27, and thereby, the pigtail 28 can ensure the largest effective length of the brush 24 within the range that the pigtail 28 does not interfere with the first inclined surface 26 and the second inclined surface 27. As a result, life time of the brush 24, i.e., of the motor can be extended.

FIGS. 3(a)–3(d) are perspective views showing respective several other embodiments of the brush according to the present invention.

Figure 3D:
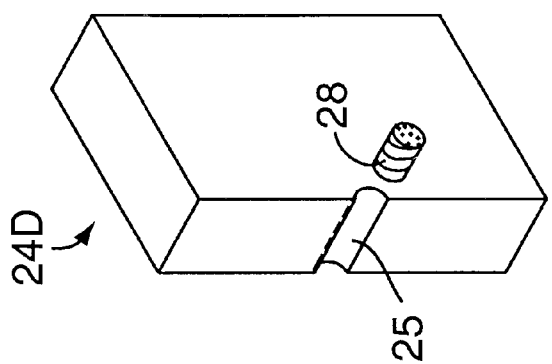
FIGS. 3(a)–3(d) are perspective views showing respective several other embodiments of the brush according to the present invention.
Figure 3C:
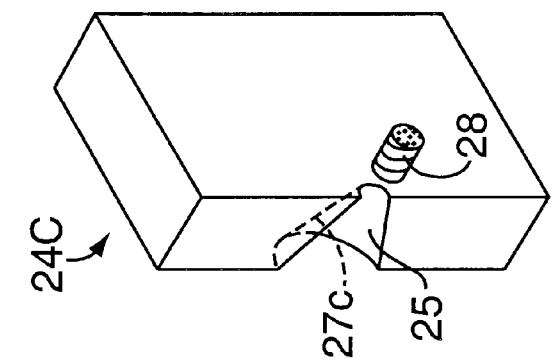
Figure 3B:
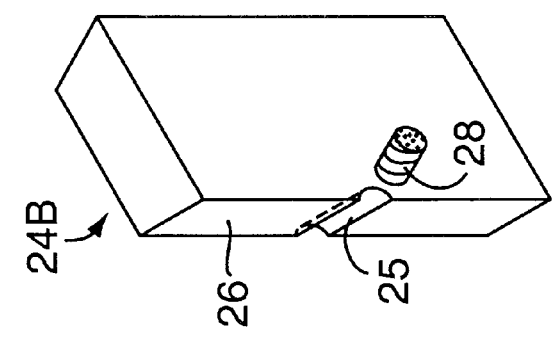
Figure 3A:
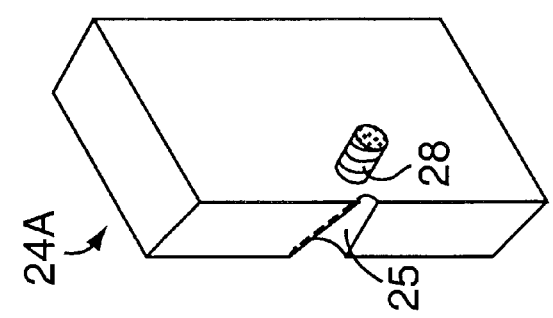

In a brush 24A shown in FIG. 3(a), a pigtail 28 is connected to the brush 24A at a point aside an engaging groove on the side of the commutator.

In a brush 24B shown in FIG. 3(b), an angle θ1 of a first inclined surface 26 is set at 30°, and a bottom surface of an engaging groove 25 is set parallel with the first inclined surface 26. Further, a pigtail 28 is connected to the brush 24B at an offset point relative to the engaging groove 25 so that the largest effective length of the brush 24B is ensured within the range of allowable size of the brush 24B.

In a brush 24C shown in FIG. 3(c), an angle θ2 of a second inclined surface 27C constituting a bottom surface of the engaging groove 25 is set at 30°. Further, a pigtail 28 is connected to the brush 24C at an offset point relative to the engaging groove 25, so that the largest effective length of the brush 24C is ensured within the range of allowable size of the brush 24C.

In a brush 24D shown in FIG. 3(d), a pigtail 28 is connected to the brush 24D at an offset point relative to an engaging groove 25.

As described above, according to the present invention, it is possible to prevent generation of brush sound due to sliding of a brush.

Further, by connecting a pigtail to a brush at an offset point relative to an engaging groove, the largest effective length of the brush can be ensured.

What is claimed is:

1. A brush holder device, in which a brush is slidably inserted into a brush holder, an action-side end portion of a torsion spring is engaged with a torsion spring engaging groove recessedly provided in an end surface of said brush, on a side opposite to a commutator, and an elastic force of the torsion spring presses the brush against the commutator, characterized in that, a first inclined surface is formed to be inclined relative to a plane perpendicular to an axis of said brush, said axis to extend in a direction through the commutator, a second inclined surface is formed in said torsion spring engaging groove, an angle of the second inclined surface being larger than that of the first inclined surface relative to the plane perpendicular to the axis of said brush, and said action-side end portion of the torsion spring is engaged with the second inclined surface.

2. The brush holder device according to claim 1, wherein an angle of inclination of said inclined surface with which said action-side end portion of the torsion spring is engaged, is more than 25° and less than 30°, relative to said plane perpendicular to the axis of said brush.

3. The brush holder device according to claim 1, wherein an angle of inclination of said second inclined surface is 30° relative to said plane perpendicular to the axis of said brush.

4. The brush holder device according to claim 1, wherein a pigtail is connected to a side surface of said brush, on a side of a proximal end of said first inclined surface, at an offset position substantially non-coincident with said torsion spring engaging groove and adjacently to an edge on the side of the proximal end of said first inclined surface to ensure the maximum effective length of the brush.

5. The brush holder device according to claim 4, wherein, said brush holder has a cut-out portion for drawing out said pigtail toward the side wall of the brush holder, and said cut-out portion is formed in such width that said offset pigtail can be drawn out irrespective of mounting direction of said brush.

6. A brush holder device, in which a brush is slidably inserted into a brush holder, an action-side end portion of a torsion spring is engaged with a torsion spring engaging groove recessedly provided in an end surface of said brush, on a side opposite to a commutator, an elastic force of the torsion spring presses the brush against the commutator, and a pigtail is connected to the brush in a side surface relative to the torsion spring engaging groove and perpendicular to said end surface, characterized in that, said pigtail is connected to the brush at an offset portion of the side surface substantially non-coincident with said torsion spring engaging groove and adjacent to an end surface of the brush to ensure the maximum effective length of the brush.

* * * * *